(12) United States Patent
Sivathanu et al.

(10) Patent No.: US 10,152,340 B2
(45) Date of Patent: Dec. 11, 2018

(54) CONFIGURING CACHE FOR I/O OPERATIONS OF VIRTUAL MACHINES

(71) Applicant: VMware, Inc., Palo Alto, CA (US)

(72) Inventors: Sankaran Sivathanu, Mountain View, CA (US); Niti Khadapkar, Mountain View, CA (US); Yifan Wang, San Jose, CA (US); Tariq Magdon-Ismail, San Jose, CA (US); Dilip Patharachalam, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 226 days.

(21) Appl. No.: 14/200,402

(22) Filed: Mar. 7, 2014

(65) Prior Publication Data

US 2015/0254000 A1 Sep. 10, 2015

(51) Int. Cl.
*G06F 12/00* (2006.01)
*G06F 9/455* (2018.01)
*G06F 12/0868* (2016.01)

(52) U.S. Cl.
CPC ...... *G06F 9/45533* (2013.01); *G06F 12/0868* (2013.01); *G06F 2009/45579* (2013.01); *G06F 2206/1014* (2013.01); *G06F 2212/222* (2013.01)

(58) Field of Classification Search
None
See application file for complete search history.

(56) References Cited

U.S. PATENT DOCUMENTS

| | | | |
|---|---|---|---|
| 2006/0074970 A1* | 4/2006 | Narayanan | G06F 11/3419 |
| 2013/0166724 A1* | 6/2013 | Bairavasundaram | |
| | | | G06F 9/5016 |
| | | | 709/224 |
| 2014/0025890 A1* | 1/2014 | Bert | G06F 12/0842 |
| | | | 711/118 |
| 2014/0173213 A1* | 6/2014 | Beveridge | G06F 3/0689 |
| | | | 711/130 |
| 2014/0310462 A1* | 10/2014 | Waldspurger | G06F 12/0891 |
| | | | 711/118 |

* cited by examiner

*Primary Examiner* — Baboucarr Faal
(74) *Attorney, Agent, or Firm* — Fish & Richardson P.C.

(57) ABSTRACT

In a computer-implemented method for configuring flash cache for input/output operations to a storage device by a plurality of virtual machines an input/output trace log for each of a plurality of virtual machines is accessed. Performance of each of the plurality of virtual machines based on a plurality of configurations of the flash cache is simulated in real-time. A recommendation of the plurality of configurations of the flash cache for the each of the plurality of virtual machines utilizing results from the simulation is generated.

21 Claims, 8 Drawing Sheets

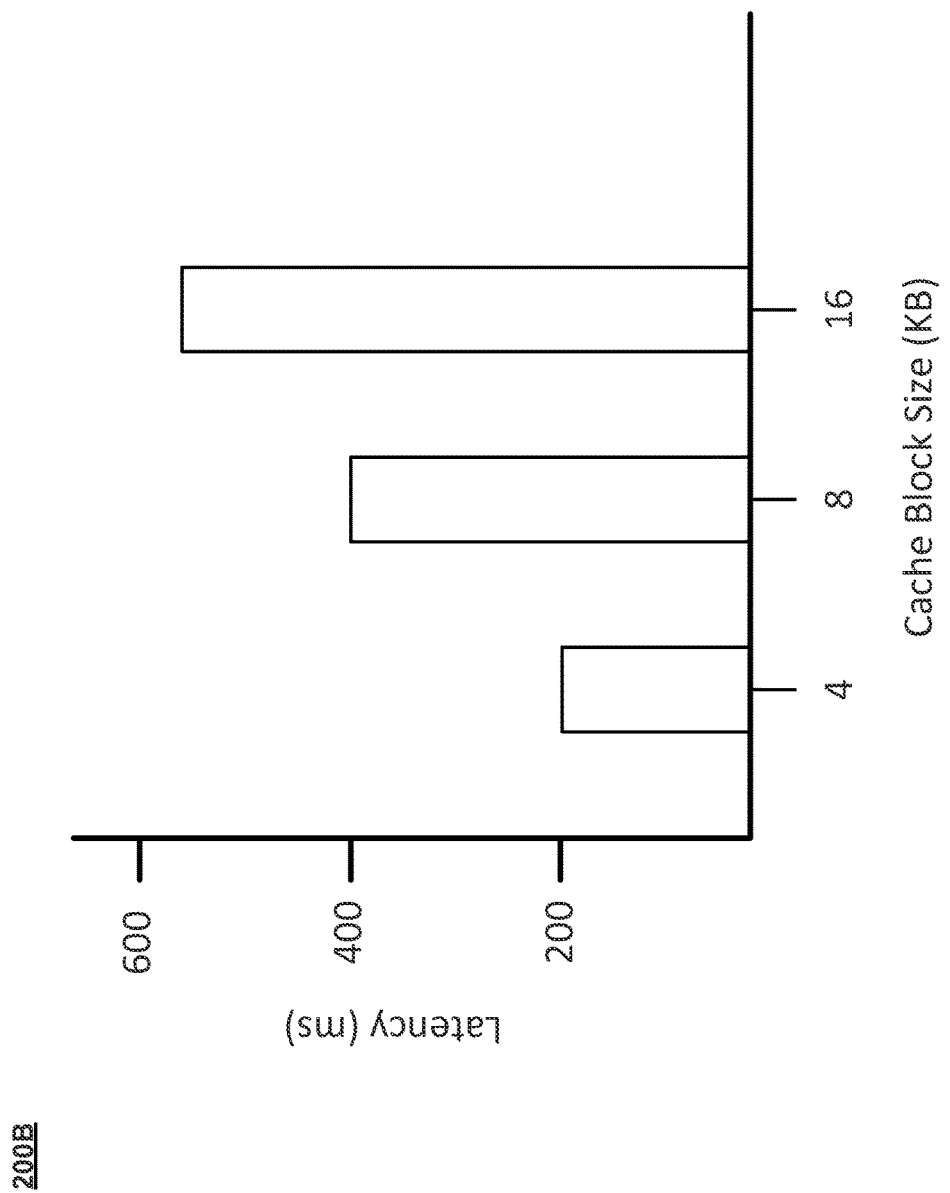

CONFIGURING CACHE FOR I/O OPERATIONS OF VIRTUAL MACHINES

BACKGROUND

The performance of virtual machines operating workloads may be negatively affected when I/O requests of the workloads are sent to a storage device. I/O request latency may occur due to the transmission of the I/O requests over the network. Moreover, utilization of the storage device may result in unnecessarily high operating costs.

More specifically, when the server system detects a virtual machine (VM) read request, the server system services the read request, if possible, from the flash cache rather than from the storage array. Since the I/O latency for flash storage access is typically several orders of magnitude less than the I/O latency for hard disk access, this caching mechanism can significantly improve VM I/O performance.

Additionally, each VM or virtual disk (VMDK) that a system administrator designates as being part of a server system's server flash cache configuration is associated with a dedicated portion of flash cache space referred to as the VM/VMDK's "cache allocation." The size of this cache allocation represents the maximum amount of data the flash storage device can cache for the VM or VMDK. Once the cache allocation reaches this cap, the server system must begin deleting cache entries from the cache allocation in order to make room for additional data. An important aspect of managing server flash cache involves determining the optimal cache allocation size for each VM or VMDK. A VM/VMDK cache allocation size that is too small will decrease the utility of the flash cache for the VM/VMDK because the server system will delete a significant percentage of the VM/VMDK's cache entries before the VM can re-access them. On the other hand, a cache allocation size that is too large will unnecessarily consume space on the flash storage device, which is space that the server system can better utilize via allocation to one or more other VMs/VMDKs.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 2B depicts a block diagram of a recommendation, according to various embodiments.

DETAILED DESCRIPTION OF CERTAIN EMBODIMENTS

Embodiments described herein are directed towards accessing in real-time an I/O trace log for a plurality of virtual machines on a host computer system. The performances of the virtual machines are simulated in real-time based on various configurations of flash cache communicatively coupled to the host computer system. A recommendation is generated that includes the simulated performances of the virtual machines having various flash cache configurations. The recommendation aids a user, such an IT admin, to effectively and efficiently reconfigure the flash cache to improve performance of the virtual machines.

In one embodiment, the method is performed for a virtualized computer system. The virtualized computer system includes a host machine and a virtualization layer (e.g., a virtual machine monitor or a hypervisor) over the host machine creating and managing virtual machines. The host machine is attached to a flash device and at least a traditional storage device (e.g., a hard drive or a remote storage array). In one embodiment, the virtualization layer allocates a portion of the flash device to each virtual machine and uses the allocated portion of the flash device to provide host-level caching for the I/O operations to the hard drive on a per-VM basis. The flash device may be used to absorb write I/Os and for read caching. The benefit from caching depends on multiple factors such as workload characteristics, cache configurations, and cache management policies. In one embodiment, the virtualization layer analyzes the I/O trace log of each VM and generates recommendations for whether or not to enable caching for a workload on a VM and what cache configurations to use. In one embodiment, the virtualization layer performs the analysis and generates the recommendation in an automatic process.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
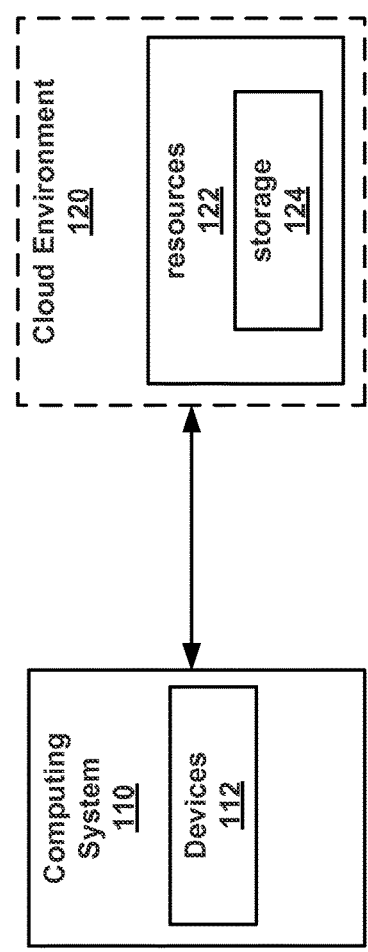
FIG. 1 depicts a block diagram of a computing system, according to various embodiments.

FIG. 1 depicts a block diagram that illustrates virtualization infrastructure that includes computing system 110 and cloud environment 120, according to various embodiments. In general, computing system 110 and cloud environment 120 are communicatively coupled over a network such that computing system 110 may access functionality of cloud environment 120.

The computing system 110 may be a system (e.g., enterprise or corporate system) or network that includes a combination of computer hardware and software. The corporation or enterprise utilizes the combination of hardware and software to organize and run its operations. For example, an enterprise system may provide various computing resource for various needs such as, but not limited to, information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in cloud environment 120 that includes one or some combination of physical computing machines. Cloud environment 120 provides resources 122, such as storage 124, servers, CPUs, network switches, etc., that are the underlying hardware infrastructure for virtualization infrastructure 100.

The physical and/or virtual machines include a variety of applications (e.g., operating system, word processing, etc.). The physical and/or virtual machines may have the same installed applications or may have different installed applications or software. The installed software may be one or more software applications from one or more vendors.

The virtual machines may include a guest operating system. Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in implementing the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, such as cloud environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

Figure 2A:
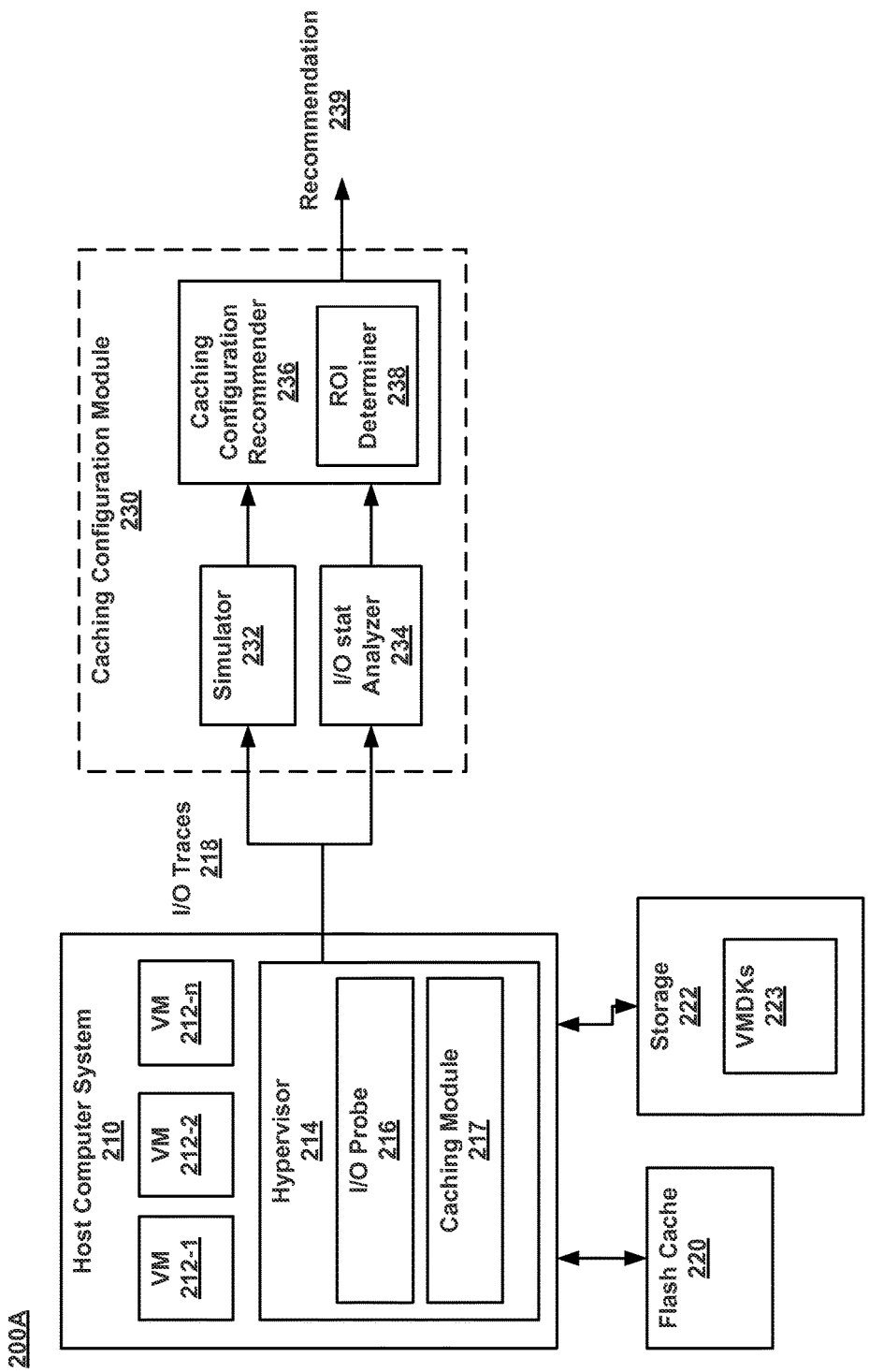
FIG. 2A depicts a block diagram of a cache assignment recommendation system, according to various embodiments.

FIG. 2A depicts an embodiment of a block diagram of caching configuration recommendation system 200A. System 200A includes, among other things, host computer system (or "host") 210 and caching configuration module 230. Host 210 is any computing system that is capable of being a host for virtual machines, such as virtual machines 212-1, 212-2, and 212-n. In one embodiment, host 210 is a server.

Host 210 includes hypervisor 214. Hypervisor 214 is installed on top of the hardware platform of host 210 and supports a virtual machine execution space within which one or more virtual machines (VMs) may be concurrently instantiated and executed.

In one embodiment, hypervisor 214 is a VMware ESX™ hypervisor, a VMware ESXi™ hypervisor, etc. For example, if hypervisor is a VMware ESX™ hypervisor, then the virtual functionality of host 210 is considered a VMware ESX™ server. Additional details regarding embodiments of structure and functionality of a host computer system are provided with respect to FIG. 6.

During use, virtual machines 212-1, 212-2, and 212-n perform various workloads. For example, the virtual machines perform the workloads based on executing various applications. The virtual machines can perform various workloads separately and/or in combination with one another.

In order to perform the workloads, the virtual machines may access resources such as storage 222 (e.g., remote or local) and/or flash cache 220 via input/output (I/O) requests. More specifically, for example, the virtual machines may provide read requests to storage 222 and/or flash cache 220, and write requests to storage 222 and/or flash cache 220.

In one embodiment, system 210 is a single stand-alone host computing system that is able to access only flash cache 220 and/or storage 222 in response to read/write requests.

Storage 222 can be, but is not limited to, disk drives, redundant array of independent disks (RAID), storage area network (SAN), hard drive based storage array, etc. In various embodiments, the virtual machines access files in storage 222 that are in a Virtual Machine Disk (VMDK) format. As such, the files may be described as VMDKs (e.g., VMDKs 223). In general, the VMDK format is a container for virtual hard disk drives to be used in virtual machines. VMDK files appear as standard disk drives to the guest operating systems of the virtual machines. The virtual disks (or VMDKs) are accessed by the VMs to access the read and write persistent data.

In one embodiment, the storage 222 is remote to host 210. As a result, the virtual machines access storage 222 over a network (e.g., LAN, Internet, etc.). In another embodiment, storage 222 could be locally attached to the host computer system 210 as well.

It should be appreciated that virtualization infrastructure 100 enables virtual storage (e.g., virtual SAN (vSAN)). Provisioning storage for a virtual infrastructure includes navigating several layers of abstraction. In one embodiment, a storage stack includes the layers of abstraction. A storage stack (e.g., an ESXi storage stack) can include, among other things, a server level (e.g., ESXi server level) for addressing and provision the storage, and a virtual machine level that enables determining how a virtual disk is portioned and addressed.

In various embodiments, flash cache 220 is flash storage that is utilized as cache memory. Flash cache 220 can be, but is not limited to, a Solid-State Drive (SSD), Peripheral Component Interconnect Express (PCIe) Flash card, etc. It should be appreciated that host 210 may include one or more memory devices.

In one embodiment, flash cache 220 is a flash storage device that comprises one or more flash caches, wherein each flash cache comprises one or more cache allocations (e.g., cache block). In another embodiment, flash cache 220 includes distinct segments (e.g., cache allocations) that map to VMDKs. In a further embodiment, flash cache 118 can include cache allocations that map to various VMs.

In one embodiment, flash cache 220 is connected locally to host 210. For example, flash cache 220 may be disposed in host 210 for fast access by the virtual machines.

In general, flash storage typically consumes less power and operates faster than traditional mechanical hard drives (e.g., hard disk drives (HDDs)). As a result, it may be beneficial to user flash cache to provide caching for I/O to storage 222, thus offloading I/O from storage 222 (e.g., a SAN) to flash cache 220 (e.g., a local SSD), which will be described in further detail below. In one embodiment, a portion of the flash cache 222 is allocated to a respective one of a plurality of virtual machines. A virtualization layer (such as a hypervisor) uses the allocated portion of the flash cache to provide host-level caching for the associated virtual machine.

Each workload of the virtual machines may exhibit different behavior and utilize storage and/or cache differently. For example, some workloads may optimally perform when utilizing cache and/or utilizing various cache configurations. That is, performance of the workloads by the virtual machines may improve when the virtual machines are assigned optimal cache configurations (e.g., cache size and/or cache block size). However, it should be understood that some workloads may not see any increase in performance when utilizing cache and/or various cache configurations.

In one embodiment, a flash read cache layer to the storage stack provides host-level caching on a per-virtual machine basis using flash devices. Moreover, for example, a vSAN flash cache is used to absorb write I/Os and for read caching. As a result, some workloads may benefit by utilizing various cache configurations (e.g., flash cache configurations).

Memory configurations, as described herein, can be but are not limited to, cache configurations (or cache assignments) including cache size, block size, working set size (WSS), etc.

For example, flash cache 220 can be any cache size (e.g., 50 gigabytes (GB)). Accordingly, various sizes (e.g., none, some, all) of flash cache 220 may be allocated to one or more virtual machines. More specifically, for example, 50% of the cache size may be allocated to virtual machine 212-1, 25% of the cache size may be allocated to virtual machine 212-2 and 25% of the cache size may be allocated to virtual machine 212-$n$ to optimize the performance of the virtual machines, which will be described in further detail below.

In another example, flash cache 220 may be configured by block size. For example, flash cache 220 can be configured to include various cache block sizes (e.g., various sizes from 4 kilobytes (KB) to 1 megabyte (MB)).

In general, a cache block size is the minimum granularity of cache fills and cache evictions. Typically, the cache block size is based on the I/O size of workloads. However, even though cache fills and cache evictions are based on the cache block size, actual read I/O serviced by the cache can be smaller than the cache block size. For example, if the cache block size is 64 KB, and 4 KB read I/O request is issued by the guest virtual machine, and if the data is not available in the cache, a 4 KB read is issued to the VMDK. When populating the cache, the new 4 KB data is placed in a 64 KB region. Furthermore, if no free space is available, a 64 KB region is evicted and the space is used to hold the new 4 KB data, and the remaining 60 KB region in the 64 KB cache block is marked as invalid. Accordingly, the cache block size may affect the performance of a workload.

In another example, flash cache 220 may be configured by working set size (WSS). The WSS, as described herein, is the amount of guest physical memory that is actively being used. Accordingly, for example, a memory allocation target (or flash allocation target) is periodically computed for each virtual machine based, in part, on an estimated WSS, a limit and a reservation.

Optimizing cache configurations for the virtual machines is based, in part, on I/O traces to/from the virtual machines.

I/O traces 218 are accessed by I/O probe 216. I/O traces are traces of I/O requests of the virtual machines performing the workloads that are accessed by I/O probe 216. I/O traces 218 are from any one of the virtual machines of system 210. It is noted that I/O traces 218 are real-time or run-time actual data. That is, I/O traces 218 are the actual real-time I/O requests of the virtual machines performing the workloads.

I/O probe 216 can be any means that is able to access I/O requests to/from the virtual machines in real-time.

In one embodiment, I/O probe 216 is a software module which utilizes tracing techniques (e.g., vscsiStats program). In general, tracing is a specialized use of logging to record information about a program's execution.

In another embodiment, I/O probe 216 utilizes instrumentation. For example, the applications of the workload include code instructions that monitor specific components in a system.

I/O traces 218 may include the following information: read/write ratio, WSS of the workload, ratio of popular blocks to one-off accesses, WSS of popular blocks, block re-use distance, working set stability, etc.

Hypervisor 214 also includes caching module 217. Caching module 110 interacts with flash cache 220 and one or more storage 222 (e.g., hard disk-based arrays). In operation, caching module 217 can leverage flash cache 220 to accelerate the I/O (e.g., I/O traces 218) between VMs and the virtual disks. For instance, caching module 217 can intercept data that the VMs read from and/or write to VMDKs and store the data in a flash cache 220. At the same time, caching module 217 can detect read requests from the VMs and determine, for each read request, whether the requested data is available in flash cache 220. That is, whether a "cache hit" has occurred. If a cache hit has occurred, caching module 217 can read the requested data from flash cache 220 rather than from storage 222.

Caching configuration module 230 includes simulator 232, I/O statistics analyzer 234, and caching configuration recommender 236, and return on investment (ROI) determiner 238.

In one embodiment, caching configuration module 230 is located within hypervisor 214. In another embodiment, caching configuration module 230 is remote from host computing system 210, for example, in a remote computing system. As a result, caching configuration module 230 does not use any processing resources of host computing system 210.

Caching configuration module 230 accesses I/O traces 218 in real-time and analyzes the I/O traces in real-time such that recommendation 239 is generated in real-time, which will be described in further detail below. As a result, storing or caching of I/O traces 218 is not required.

Simulator 232 is configured to simulate the virtual machines executing their current workloads with various cache configurations in real-time based on received I/O traces 218. That is, simulator 232 simulates the traits of various cache configurations for the virtual machines with real-time I/O data.

For example, virtual machine 212-1 operates a first workload, virtual machine 212-2 operates a second workload, and virtual machine 212-$n$ operates a third workload. The real-time and actual I/O traces for the workloads are captured. Simulator 232 receives the I/O traces pertaining to the workloads, in real-time. Simulator 232 then simulates, in real-time, each of the virtual machines operating their respective workload with various cache configurations (e.g., different cache sizes, different cache block sizes, etc.) based on the I/O traces. The performance of the virtual machines with various cache configurations are then monitored and compared with one another.

In another example, the virtual machines execute a workload in combination with one another. The I/O traces for the workload are captured and are received by simulator 232. Simulator 232 then simulates, in real-time, each of the virtual machines operating the workload, in combination, with various cache configurations. The performance of the virtual machines with various cache configurations are then monitored and compared with one another.

In one embodiment, simulator 232 provides Adaptive Replacement Cache (ARC) simulation. In general, ARC simulation is a page replacement algorithm that tracks both frequently used and recently used pages plus a recent eviction history for both. It should be appreciated that simulator 232 may be any algorithm that is compatible with simulating a virtual machine, in real-time, having various cache configurations.

It should be appreciated that simulator 232 receives the actual I/O signals of the VMs and then generates actual performance results of the VMs having various flash cache configurations as described in recommendation 239.

The actual performance results are wholly accurate and do not include any assumptions or predictions. This is due to simulator 232 receiving actual I/O requests and generating actual results of various cache configurations from the actual I/O requests.

I/O statistics analyzer 234 is configured to receive I/O traces 218 and analyze I/O statistics of the received I/O traces. For example, I/O statistics analyzer 234 analyzes the I/O traces and determines any patterns or characteristics of the I/O traces. For example, it is determined that the I/O traces are mostly random, or mostly sequential. Other characteristics can be, but are not limited to, WSS, block size, etc.

Caching configuration recommender 236 is configured to generate recommendation 239 of one or more cache configurations for enhancing performance of one or more virtual machines. More specifically, caching configuration recommender 236 receives the output of simulator 232, I/O statistics analyzer 234, and ROI determiner 238 and then generates recommendation 239.

ROI determiner 238 is configured to determine a ROI pertaining to utilizing flash cache 220 rather than storage 222. For example, based on various simulated cache configurations, it is determined that I/O can be offloaded from storage 222 to flash cache 220. As a result, it is less expensive to perform the workloads by offloading the I/O from storage 222 to flash cache 220. Therefore, there is a particular ROI or cost savings, when one or more virtual machines utilize one or more configurations of flash cache 220.

In one example, offloading read/write signals from storage 222 onto flash cache 220 allows storage 222 to have more storage available. The additional storage enables additional information to be stored on storage 222 that would not have been able to be stored on storage 222 otherwise.

The ROI can be based on the cost per I/O request (e.g., $/IO). For instance, each SAN has a known (1) I/O capacity and (2) a cost for the SAN. As such, a cost per/IO is determined for each SAN. Accordingly, the ROI can be determined by the following equation:

$$ROI(\$)=(\text{storage cost/total storage I/O capacity})\times \text{amount of I/O offloaded from storage}$$

In various embodiments, ROI can also include various other system characteristics, such as, but not limited to power consumption, I/O consumption value, etc.

In one embodiment, an IT administrator may implement the one or more cache configurations to one or more virtual machines.

In various embodiments, recommendation 239 may be a report, graph, or the like provided in real-time. Recommendation 239 may depict or describe various performance metrics correlating to simulated workloads on the virtual machines. For example, the performance metrics can be, but are not limited to, cache consumed or cache consumed with respect to cache block size, latency with respect to cache block size, etc.

Recommendation 239 provides actual real-time performance information that enables a user (e.g., IT admin) to make a more educated and informed decision for controlling the allocation and configuration for flash cache 220. Recommendation 239 can include, but is not limited to, performance of VMs having various flash cache configurations and/or performance of VMs having additional flash cache than what is currently provided for host computer system 210.

It is noted that recommendation 239 does not necessarily provide a recommendation for optimal VM performance. For example, recommendation 239 may generate a recommendation that provides a non-optimal performance of the VMs. In such an example, the recommendation highlights low power consumption or high ROI which does not correspond to optimal VM performance.

FIG. 2B illustrates an embodiment of graph 200B (an example of recommendation 239) depicting the correlation between latency of requests of the I/O traces and cache block size. For example, caching configuration module 230 receives I/O traces 218 of virtual machine 212-1. Simulator 232 simulates the workload of virtual machine 212-1 utilizing flash cache 220 having various cache block sizes (e.g., 4 KB, 8 KB and 16 KB).

Caching configuration recommender 236 then generates recommendation 239 that depicts performance results of the virtual machine associated with various block sizes of memory. For example, recommendation 239 depicts performance results (e.g., latency of 200 milliseconds (ms)) of virtual machine 212-1 utilizing flash cache 220 having a 4 KB cache block size, the performance results (e.g., latency of 400 ms) of virtual machine 212-1 utilizing flash cache 220 having an 8 KB cache block size, and the performance results (e.g., latency of 600 ms) of virtual machine 212-1 utilizing flash cache 220 having a 16 KB cache block size.

Based on the recommendation from graph 200B, a user (e.g., IT administrator) could determine that a cache block size of 4 KB would have a higher performance based on the low latency of 200 ms. As a result, the user could implement the recommendation by allocating a block size of 4 KB.

In another embodiment, recommendation 239 may depict the ROI correlating to cache block size. For example, a simulation of virtual machine 212-1 utilizing flash cache 220 having a cache block size of 4 KB may have a first ROI, while a simulation of virtual machine 212-1 utilizing flash cache 220 having other cache sizes with resulting ROIs lower than the first ROI (associated with the cache block size of 4 KB).

Based on the recommendation, a user (e.g., IT administrator) would understand that a cache block size of 4 KB has a higher performance (e.g., a higher ROI) as compared to other block sizes. As a result, the user could implement the recommendation.

In various embodiments, recommendation 239 may depict one or more graphs or descriptions. For example, recommendation 239 depicts a graph of cache block size versus latency for virtual machines 212-1, 212-2 and 212-n.

Figure 2C:
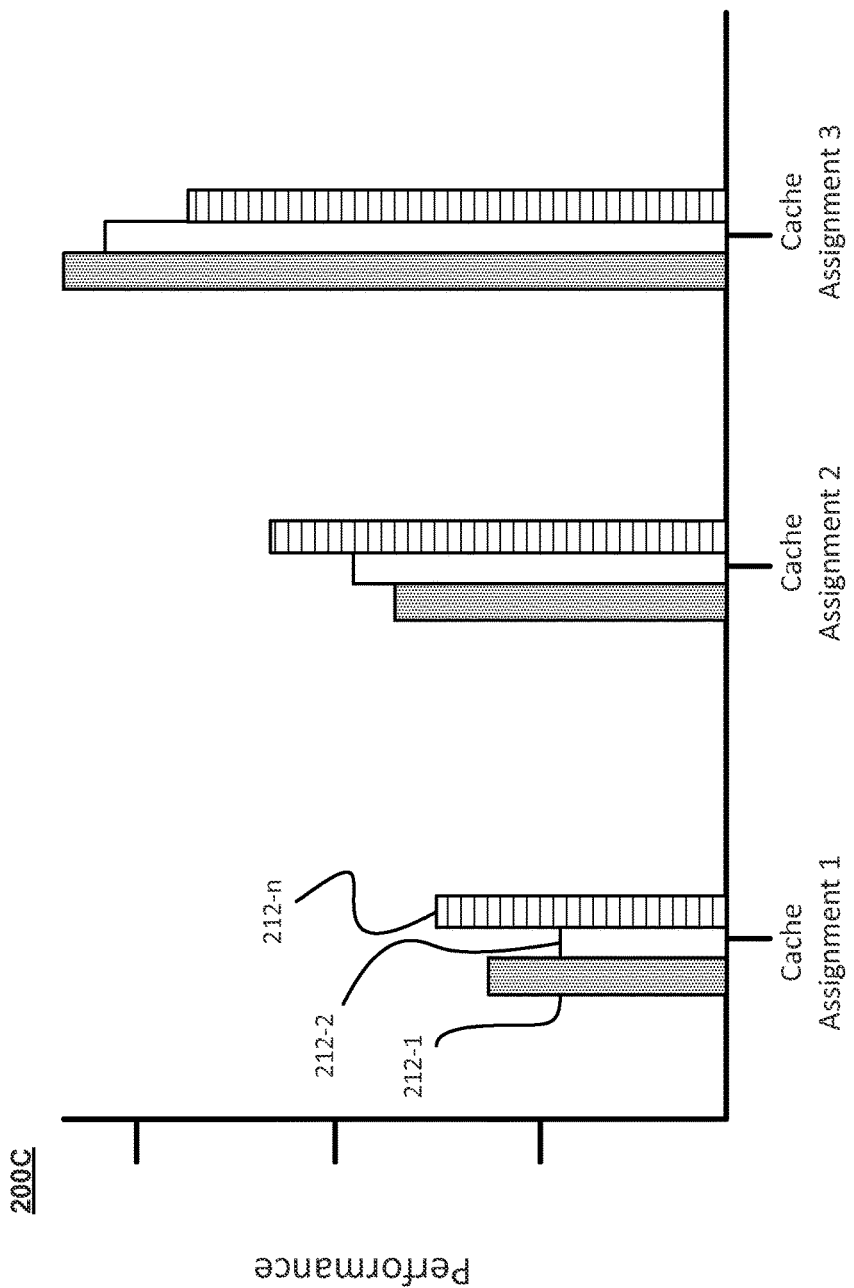
FIG. 2C depicts a block diagram of a recommendation, according to various embodiments.

FIG. 2C illustrates an embodiment of graph 2000 (an example of recommendation 239) depicting the correlation of various cache assignments (e.g., Cache Assignment 1, Cache Assignment 2, and Cache Assignment 3) and their respective simulated performances.

Although graph 2000 depicts three different cache assignments, it should be appreciated that caching configuration recommender 236 can recommend any number of cache assignments/configurations.

In one example, Cache assignment 1 includes $X_1\%$ of cache assigned to virtual machine 212-1, $Y_1\%$ of cache assigned to virtual machine 212-2, and $Z_1\%$ of memory assigned to virtual machine 212-n.

Cache assignment 2 includes $X_2\%$ of memory assigned to virtual machine 212-1, $Y_2\%$ of cache assigned to virtual machine 212-2, and $Z_2\%$ of cache assigned to virtual machine 212-n.

Cache assignment 3 includes $X_3\%$ of cache assigned to virtual machine 212-1, $Y_3\%$ of memory assigned to virtual machine 212-2, and $Z_3\%$ of cache assigned to virtual machine 212-n.

In such an example, performance is latency (in ms), which is similar to FIG. 2B, as described above. As such, the average latency of Cache assignment 1 is lower than the latency of Cache assignment 2 and Cache assignment 3. Based on the recommendation from graph 2000, a user (e.g., IT administrator) would understand that a cache (or memory) allocation correlating to Cache assignment 1 (e.g., 80% of flash cache 220 allocated to virtual machine 212-1, 10% allocated to virtual machine 212-2 and 10% allocated to virtual machine 212-n) has a higher overall performance (e.g., lower latency) as compared to the other cache assignments.

In another example, performance is ROI (in $). As such, the average ROI of Cache assignment 3 is higher than the ROI of Cache assignment 1 and Cache assignment 2. Based on the recommendation from graph 2000, a user (e.g., IT administrator) would understand that Cache assignment 3 (e.g., 80% of flash cache 220 allocated to virtual machine 212-1, 10% allocated to virtual machine 212-2 and 10% allocated to virtual machine 212-n allocation) has a higher overall performance (e.g., ROI) as compared to the other cache assignments.

It should be appreciated that recommendation 239 may depict a graph of various cache (or memory) allocation characteristics versus various simulated performance results of the virtual machines.

In one example, the performance results may include avoidance or less use of RAID. In such an example, a graph depicts how much I/O is offloaded from RAID correlating to various simulated performance results of the virtual machines.

In another example, a graph depicts various performance thresholds. In such an example, a particular cache allocation is recommended when performance results of one or more virtual machines are less than a threshold performance (e.g., latency). Additionally, a particular cache allocation is recommended when performance results of one or more virtual machines are more than a threshold performance (e.g., ROI).

In an additional example, the performance results are related to a Quality of Service (QoS). For example, a first simulation of various virtual machines having a first cache allocation meets a QoS requirement. While, other simulations of various virtual machines having other cache allocations do not meet a QoS requirement.

Recommendation 239 can also take into account various other information and computing characteristics. For example, recommendation 239 is based at least in part on spatial locality of VM/VMDK I/O operations, temporal locality of VM/VMDK I/O operations, I/O access characteristics (e.g., read/write ratio), backend storage device service times, etc.

Moreover, computer host system 210 or hypervisor 214 may continuously monitor, for example, changes in VM/VMDK workloads, VM/VMDK configuration events (e.g., VM power on/off, VM suspend, resume, VM migration, etc.) and other conditions that may affect the flash cache allocation and recommendation 239. When the server system detects such conditions, the server system may re-trigger the generation of recommendation 239 and/or the simulation of per VM/VMDK cache allocation sizes, thereby ensuring that the recommendation of flash cache space allocation may be optimized.

Example Methods of Operation

Figure 3:
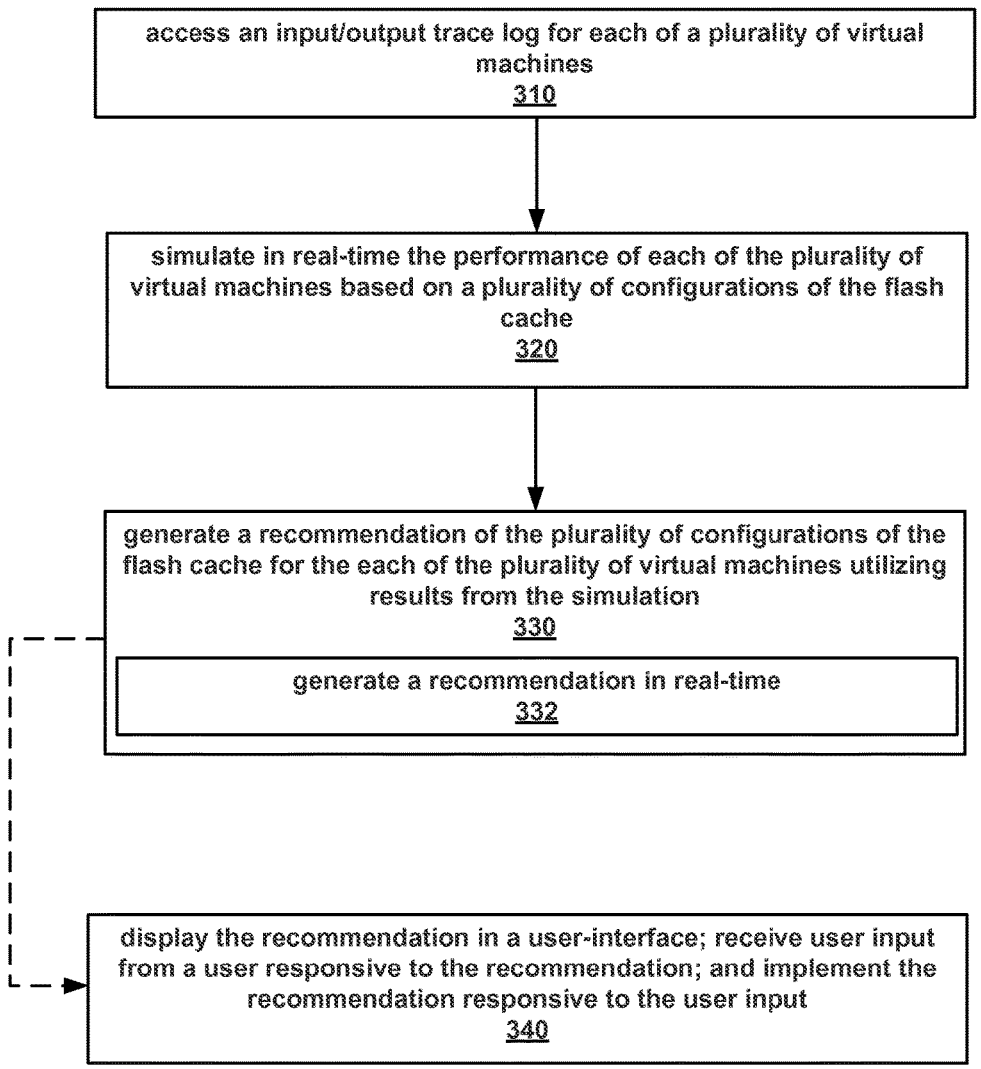
FIG. 3 depicts a flow diagram for a method for generating a recommendation of configurations for the flash cache for a plurality of virtual machines, according to various embodiments.
Figure 4:
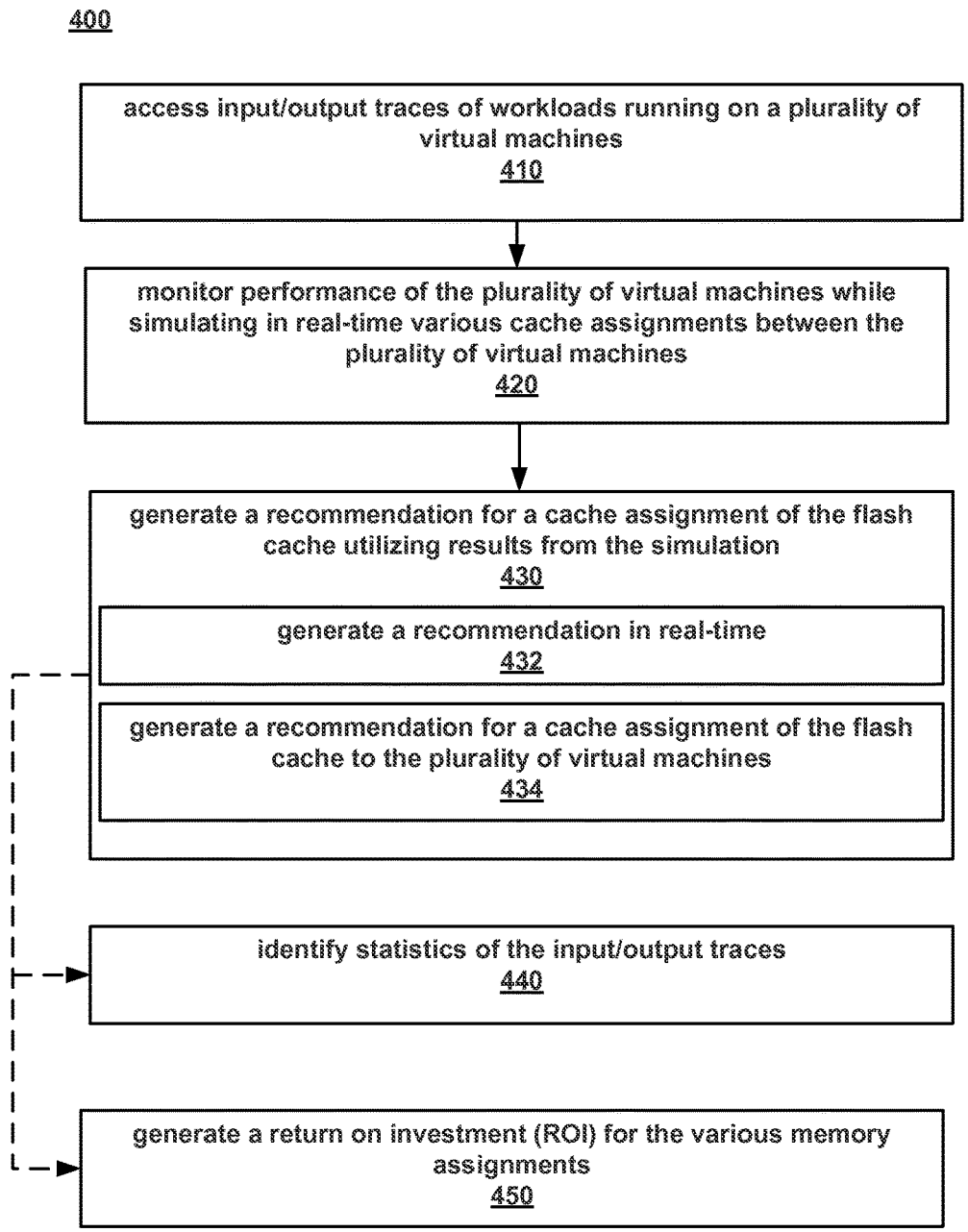
FIG. 4 depicts a flow diagram for a method for generating a recommendation of a cache assignment for virtual machines, according to various embodiments.
Figure 5:
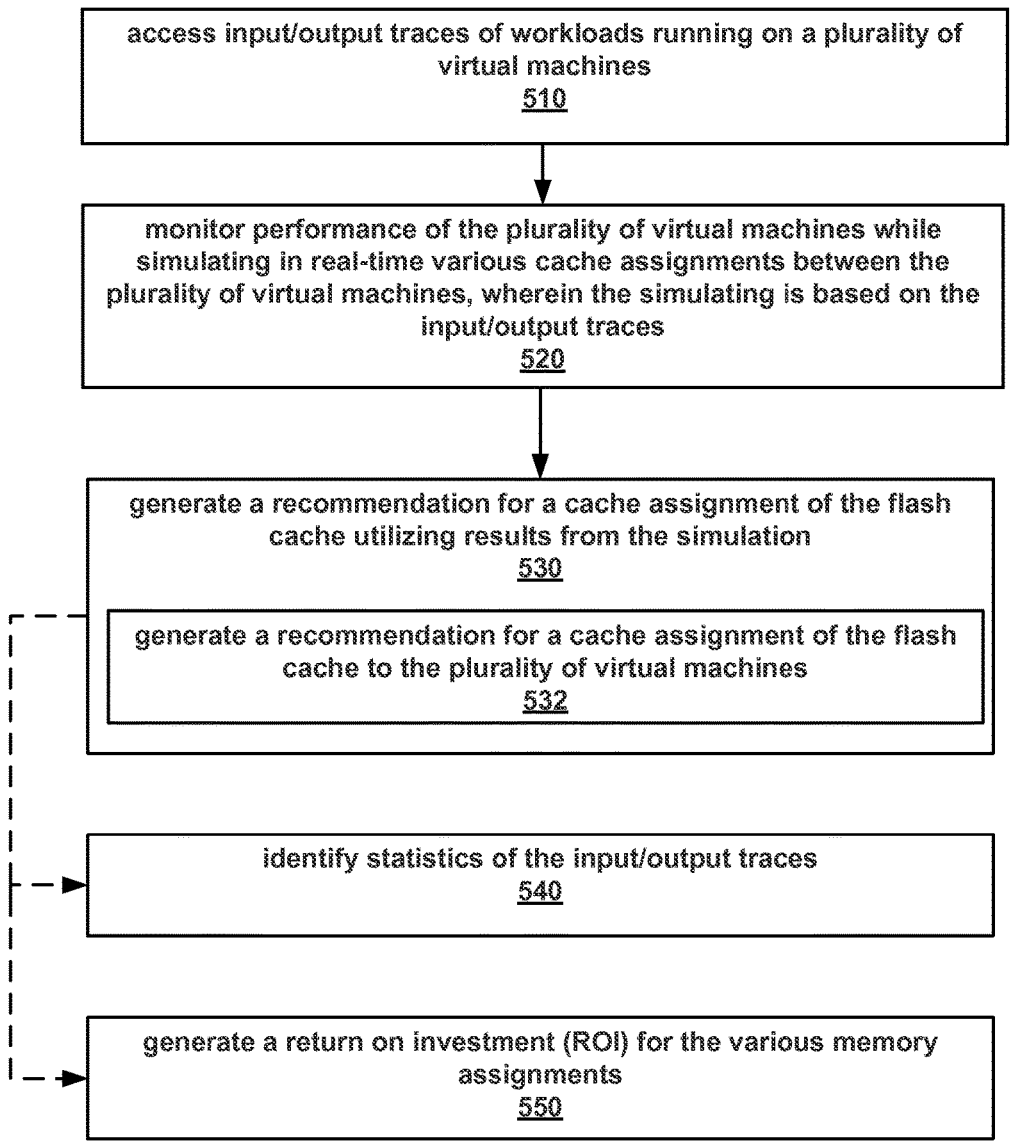
FIG. 5 depicts a flow diagram for a method for generating a recommendation of a cache assignment for virtual machines, according to various embodiments.

The following discussion sets forth in detail the operation of some example methods of operation of embodiments. With reference to FIGS. 3, 4 and 5, flow diagrams 300, 400 and 500 illustrate example procedures used by various embodiments. Row diagrams 300-500 include some procedures that, in various embodiments, are carried out by a processor under the control of computer-readable and computer-executable instructions. In this fashion, procedures described herein and in conjunction with flow diagrams 300, 400 and/or 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or cloud environments (e.g. cloud environment 120). The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 300, 400 and 500 such procedures are examples. That is, embodiments are well suited to performing various other procedures or variations of the procedures recited in flow diagrams 300, 400 and 500. Likewise, in some embodiments, the procedures in flow diagrams 300, 400 and 500 may be performed in an order different than presented and/or not all of the procedures described in one or more of these flow diagrams may be performed. It is further appreciated that procedures described in flow diagrams 300, 400 and 500 may be implemented in hardware, or a combination of hardware with firmware and/or software.

FIG. 3 depicts a process flow diagram 300 for configuring flash cache, according to various embodiments.

At 310, an input/output trace log for each of a plurality of virtual machines is accessed. For example, virtual machine 212-1 executes one or more applications. I/O probe 216 traces the I/O trace log (e.g., I/O traces 218) of the workload in real-time. Caching configuration module 230 accesses I/O traces 218 of the workload performed by the virtual machine in real-time.

At 320, the performance of each of the plurality of virtual machines simulated in real-time based on a plurality of configurations of the flash cache. For example, virtual machines 212-1 through 212-n are allocated the use of flash cache 220 having a cache block size of 4 KB. I/O traces 218 of the workload utilizing the cache block size of 4 KB are captured by I/O probe 216.

Simulator 232 accesses I/O traces 218 of the workload utilizing the cache block size of 4 KB. Simulator 232 then simulates the operation of workload by virtual machines 212-1 through 212-n utilizing memory having various cache sizes (e.g., 8 KB, 16 KB, 32 KB, etc.) other than the current 4 KB cache size.

It is noted that the results of the simulation are the actual performance results of the VMs as if they were actually using the various configurations of flash cache 220. Such configurations can be, but are not limited to, cache block size, additional flash cache integrated into flash cache 220, etc. An example of such performance results are depicted in at least FIG. 2C.

The simulated performance of the virtual machine operating the workload utilizing the other various cache sizes (e.g., 8 KB, 16 KB, 32 KB, etc.) are monitored, for example, by simulator 232 and/or caching configuration recommender 236.

At 330, a recommendation of the plurality of configurations of the flash cache is generated for the each of the plurality of virtual machines utilizing results from the simulation. For example, caching configuration recommender 236 receives the output of, at least, simulator 232. Based on the results from simulator 232, caching configuration recommender 236 generates recommendation 239 (e.g., graph 200B and graph 200C) that recommends a cache assignment for the virtual machine(s) to increase the performance of the virtual machine.

In one embodiment, the recommendation is based in part on a return on investment (ROI) of offloading I/O requests from storage onto said flash cache. For example, the cache assignments of FIG. 2C include a ROI. In such an example, the cache assignments are generated considering the actual cost ($) of offloading I/O requests from storage 222 onto flash cache 220.

At 332, in one embodiment, a recommendation is generated in real-time. For example, simulator 232 receives I/O traces 218 in real-time of the actual operation of the workload on virtual machine 212-1. Simulator 232 generates the simulation of the virtual machine in real-time. Accordingly, recommendation 239 is generated in real-time.

At 340, the recommendation in a user-interface is displayed; user input from a user is received responsive to the recommendation; and the recommendation is implemented responsive to the user input. For example, recommendation 239 (e.g., graph 200C) is displayed in a user-interface for viewing by an IT admin. The IT admin observes graph 200C and determines that Cache assignment 2 that should be cache flash configuration. As such, the IT admin enters instructions to reconfigure flash cache according to the recommendation of Cache assignment 2. In response to the user instructions, flash cache 220 is actually reconfigured according to recommendation of Cache assignment 2.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment.

FIG. 4 depicts a process flow diagram 400 for generating a recommendation of a cache assignment for virtual machines, according to various embodiments.

At 410, input/output traces of workloads running on a plurality of virtual machines are accessed. For example, virtual machines 212-1, 212-1 and 212-n each concurrently perform a workload. I/O traces 218 of each workload of the virtual machines are captured by I/O probe 216 in real-time.

At 420, performance of the plurality of virtual machines is monitored while simulating in real-time various cache assignments between the plurality of virtual machines. For example, virtual machines 212-1, 212-2, and 212-n perform an actual workload in combination or perform separate workloads. Performance of the virtual machines may increase by offloading I/O requests over the network to storage 222 onto locally located flash cache 220.

Simulator 232 accesses I/O traces 218 of the virtual machines performing the workload(s) and simulates the performance of the virtual machines while the virtual machines utilize various cache configurations. Monitoring the simulated performance of the virtual machines facilitates in determining that the virtual machines may benefit from utilizing flash cache 220 and may benefit from various cache configurations. Examples of cache configurations may include cache allocation, block size, etc.

At 430, a recommendation for a cache assignment of the memory (e.g., flash cache) utilizing results from the simulation is generated. For example, caching configuration recommender 236 receives output from simulator 232, I/O statistics analyzer and ROI determiner 238 and generates recommendation (e.g., graph 2000) for various cache configurations that may improve the performance of the virtual machines.

At 432, in one embodiment, a recommendation is generated in real-time. For example, recommendation 239 is provided concurrently with the actual performance of the workloads of the virtual machines. The real-time recommendation enables for on-the-fly assignment of cache and cache configurations for the virtual machines such that performance of the virtual machines may improve.

At 434, in another embodiment, a recommendation for a cache assignment of the flash cache to the plurality of virtual machines is generated. For example, based on I/O traces 218 of the currently performing virtual machines, a recommendation (e.g., graph 2000) recommends Cache assignment 1 (e.g., 80% of flash cache 220 should be allocated to virtual machine 212-1, 10% of flash cache 220 should be allocated to virtual machine 212-2 and 10% of the cache should be allocated to virtual machine 212-n) based on the latency performance of such a cache configuration.

At 440, statistics of the input/output traces are identified. For example, I/O statistics analyzer 234 analyzes I/O traces 218 for various statistics to facilitate in the generation of recommendation 239. The statistics can be, but are not limited to, block size, WSS, etc.

At 450, a return on investment (ROI) for the various cache assignments is generated. For example, storage 222 is oftentimes expensive to purchase and operate. Accordingly, there is a ROI if less storage is used and/or used less often. Accordingly, a ROI is generated for each cache configuration that is recommended to be utilized.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a process flow diagram 500 for generating a recommendation of a cache assignment for virtual machines, according to various embodiments.

At 510, input/output traces of workloads running on a plurality of virtual machines are accessed. For example, virtual machines 212-1, 212-1 and 212-n perform separate workloads concurrently. I/O traces 218 of each workload of the virtual machines are captured by I/O probe 216 in real-time. For example, I/O probe 216 is a vscsiStats program.

At 520, performance of the plurality of virtual machines is monitored while simulating in real-time various cache assignments between the plurality of virtual machines, wherein the simulating is based on the input/output traces.

For example, virtual machines 212-1, 212-2, and 212-n perform separate workloads concurrently. Performance of the virtual machines may increase by offloading I/O requests over the network to storage 222 onto locally located flash cache 220.

Simulator 232 accesses I/O traces 218 of the virtual machines performing the workloads and simulates the performance of the virtual machines while the virtual machines utilize various cache configurations. Monitoring the simulated performance of the virtual machines facilitates in determining that the virtual machines may benefit from utilizing flash cache 220 and may benefit from various cache configurations. Examples of cache configurations may include cache allocation, block size, etc.

At 530, a recommendation for a cache assignment of the flash cache utilizing results from the simulation is generated. For example, caching configuration recommender 236 receives simulation results from simulator 232, various I/O statistics from I/O statistics analyzer 234 and ROI results from ROI determiner 238. As a result, caching configuration recommender 236 generates a recommendation (e.g., graph 200C) for various cache configurations that may improve the performance of the virtual machines.

At 532, in one embodiment, a recommendation for a cache assignment of the flash cache to the plurality of virtual machines is generated. For example, based on I/O traces 218 of the workloads performing on the virtual machines, a recommendation (e.g., graph 200C) recommends Cache assignment 3 (e.g., 20% of flash cache 220 should be allocated to virtual machine 212-1, 20% of flash cache 220 should be allocated to virtual machine 212-2 and 40% of the flash cache should be allocated to virtual machine 212-n) based on the ROI of such cache configuration.

At 540, statistics of the input/output traces are identified. For example, I/O statistics analyzer 234 accesses I/O traces 218, in real-time, and determines various I/O statistics, such as, WSS, read/write I/O ratio, etc.

At 550, a return on investment (ROI) for the various cache assignments is generated. For example, storage 222 is oftentimes expensive to purchase and operate. Accordingly, there is a ROI if less storage is used and/or used less often. Accordingly, a ROI is generated for each cache configuration that is recommended to be utilized.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

Example Host Computer System

Figure 6:
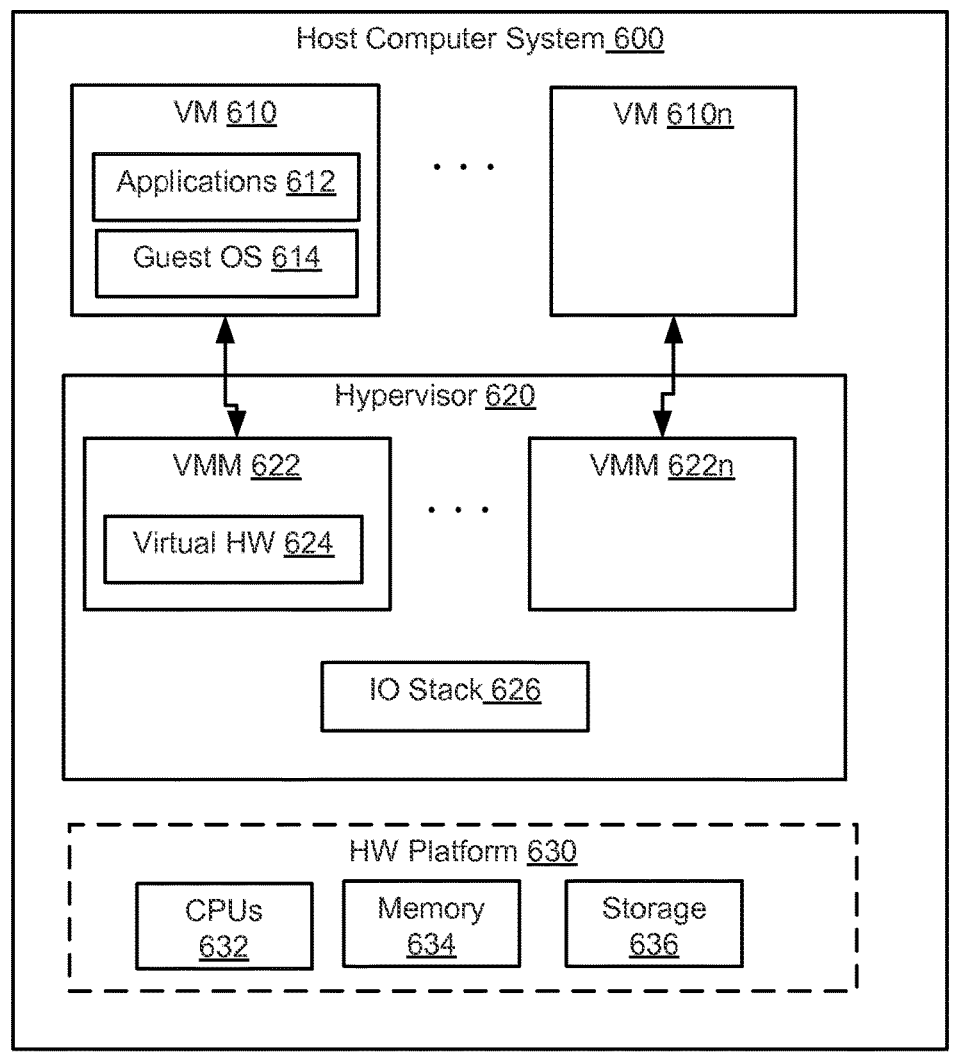
FIG. 6 depicts a block diagram that illustrates an embodiment of a host computing system.

FIG. 6 is a schematic diagram that illustrates a virtualized computer system that is configured to carry out one or more embodiments of the present invention. The virtualized computer system is implemented in a host computer system 600 including hardware platform 630. In one embodiment, host computer system 600 is constructed on a conventional, typically server-class, hardware platform.

Hardware platform 630 includes one or more central processing units (CPUs) 632, system memory 634, and storage 636. Hardware platform 630 may also include one or more network interface controllers (NICs) that connect host computer system 600 to a network, and one or more host bus adapters (HBAs) that connect host computer system 600 to a persistent storage unit.

Hypervisor 620 is installed on top of hardware platform 630 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 624 for virtual machine 610 supports the installation of guest OS 614 which is capable of executing applications 612 within virtual machine 610.

Guest OS 614 may be any of the well-known commodity operating systems, and includes a native file system layer, for example, either an NTFS or an ext3FS type file system layer. IOs issued by guest OS 614 through the native file system layer appear to guest OS 614 as being routed to one or more virtual disks provisioned for virtual machine 610 for final execution, but such IOs are, in reality, are reprocessed by IO stack 626 of hypervisor 620 and the reprocessed IOs are issued, for example, through an HBA to a storage system.

Virtual machine monitor (VMM) 622 and 622n may be considered separate virtualization components between the virtual machines and hypervisor 620 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method for configuring flash cache for input/output operations to a storage device by a plurality of virtual machines comprising:
    accessing an input/output trace log for each of a plurality of virtual machines, wherein the input/output trace log comprises run-time actual data of input/output requests of each of the plurality of virtual machines executing workloads;
    using the input/output requests of each respective virtual machine to simulate real-time performance of the corresponding virtual machine for each of a plurality of configurations of the flash cache used by the plurality of virtual machines, wherein each configuration assigns a number of cache blocks from the flash cache to each virtual machine of the plurality of virtual machines such that a different number of blocks are assigned to the same virtual machine in two or more configurations, and wherein each simulated real-time performance indicates an overall performance of the plurality of virtual machines as a whole according to the particular cache allocations assigned to each virtual machine of the plurality of virtual machines for that simulated performance; and
    generating a recommendation for assigning blocks of the flash cache based on respective simulated real-time performance of the plurality of virtual machines as a whole for each of the plurality of configurations of the flash cache for the plurality of virtual machines including recommending a particular configuration of cache allocations comprising a particular combination of cache allotments that assigns a number of blocks to each virtual machine of the plurality of virtual machines that reduces overall latency of the plurality of virtual machines.

2. The computer-implemented method of claim 1, wherein the recommendation is based in part on a return on investment (ROI) of offloading I/O requests from a storage onto the flash cache.

3. The computer-implemented method of claim 1, further comprising:
    displaying the recommendation in a user-interface;
    receiving user input from a user responsive to the recommendation; and
    implementing the recommendation responsive to the user input.

4. The computer-implemented method of claim 1, wherein generating a recommendation, further comprises:
    generating a recommendation in real-time.

5. A computer-implemented method for generating a recommendation of configurations for flash cache input/output operations to a storage device by virtual machines comprising:
    accessing input/output traces of workloads running on a plurality of virtual machines, wherein the input/output traces comprise run-time actual data of input/output requests of each of the plurality of virtual machines executing said workloads;
    monitoring performance of the plurality of virtual machines while simulating in real-time the performance of each of the plurality of virtual machines according to various cache assignments for each virtual machine using the flash cache and using the run-time actual data of the input/output requests for the plurality of virtual machines executing the workloads, wherein the cache assignments include a plurality of distinct allocations of cache blocks of the flash cache to the virtual machines such that a different number of blocks are assigned to the same virtual machine in two or more configurations; and
    generating a recommendation for each virtual machine for a particular cache assignment of the flash cache using the results based on the monitoring and the simulation of the corresponding virtual machine.

6. The computer-implemented method of claim 5, further comprising:
    identifying statistics of the input/output traces.

7. The computer-implemented method of claim 6, wherein the statistics comprise:
    a working set size (WSS).

8. The computer-implemented method of claim 5, further comprising:
    generating a return on investment (ROI) for the various cache assignments.

9. The computer-implemented method of claim 5, wherein generating a recommendation, further comprises:
    generating a recommendation in real-time.

10. The computer-implemented method of claim 5, wherein generating a recommendation for a cache assignment of the flash cache for a particular virtual machine includes a recommendation of a share of the flash cache to allocate to the particular virtual machine of the plurality of virtual machines.

11. The computer-implemented method of claim 5, wherein the flash cache is a solid state drive (SSD).

12. The computer-implemented method of claim 5, wherein the flash cache is a solid state drive (SSD) disposed in a host of the plurality of virtual machines.

13. The computer-implemented method of claim 5, wherein configurations of the cache assignment are selected from a group consisting of: cache size, block size, and a working set size (WSS).

14. The method of claim 5, wherein generating the recommendation includes comparing the results of the simulations according to various cache assignments with the monitored performance of the virtual machines according to a current cache allocation, and, based on the comparing, recommending a particular cache assignment that improves performance of the virtual machines.

15. A non-transitory computer-readable storage medium having instructions embodied therein that when executed cause a computer system to perform operations for generating a recommendation of a cache assignment to virtual machines, the operations comprising:

accessing input/output traces of workloads running on a plurality of virtual machines, wherein the input/output traces comprise run-time actual data of input/output requests of each of the plurality of virtual machines executing said workloads;

monitoring performance of the plurality of virtual machines while simulating in real-time the performance of each of the plurality of virtual machines according to various cache assignments for each virtual machine using the flash cache and using the run-time actual data of the input/output requests for the plurality of virtual machines executing the workloads; and generating a recommendation for each virtual machine for a particular cache assignment of the flash cache based on the monitoring and the results from the simulation of the corresponding virtual machine, wherein the recommendation includes a recommendation for a particular configuration simulated for the virtual machines that improves overall performance of the virtual machines relative to the current performance of the plurality of virtual machines and configurations of the other simulations.

16. The non-transitory computer-readable storage medium of claim 15, the operations further comprising:
identifying statistics of said input/output traces.

17. The non-transitory computer-readable storage medium of claim 16, wherein the statistics comprise:
a working set size (WSS).

18. The non-transitory computer-readable storage medium of claim 15, the operations further comprising:
generating a return on investment (ROI) for the various cache assignments.

19. The non-transitory computer-readable storage medium of claim 15, wherein the flash cache is a solid state drive (SSD).

20. The non-transitory computer-readable storage medium of claim 15, wherein generating a recommendation further comprises:
generating a recommendation for a cache assignment of the flash cache to the plurality of virtual machines.

21. The non-transitory computer-readable storage medium of claim 15, wherein configurations of the cache assignment are selected from a group consisting of: cache size, block size, and a working set size (WSS).

* * * * *